United States Patent [19]

Gibbs

[11] Patent Number: 5,000,554

[45] Date of Patent: Mar. 19, 1991

[54] METHOD AND APPARATUS FOR USE IN MICROSCOPE INVESTIGATIONS WITH A CARRIER HAVING EXACTLY ONE X-Y COORDINATE SYSTEM REFERENCE MARK

[76] Inventor: David L. Gibbs, 250 Mercer St., New York, N.Y. 10012

[21] Appl. No.: 527,300

[22] Filed: May 23, 1990

[51] Int. Cl.$^5$ .................... G02B 21/26; G02B 27/36
[52] U.S. Cl. .................................. 350/529; 350/531; 382/6
[58] Field of Search .............. 350/529, 530, 531, 534, 350/535; 356/39, 152; 377/10; 382/6; 364/518, 413.08; 318/640

[56] References Cited

U.S. PATENT DOCUMENTS

| | | |
|---|---|---|
| 893,957 | 7/1908 | Watkins . |
| 1,824,097 | 9/1931 | Ott . |
| 1,876,176 | 9/1932 | Sulzner . |
| 1,996,141 | 4/1935 | Broadhurst et al. . |
| 2,148,908 | 2/1939 | Lory . |
| 2,279,412 | 4/1942 | Posada . |
| 2,474,163 | 6/1949 | Riley . |
| 2,574,522 | 11/1951 | Bennett . |
| 3,175,458 | 3/1965 | Costa . |
| 3,359,055 | 12/1967 | Krause . |
| 3,600,057 | 8/1971 | Leffler . |
| 3,622,856 | 11/1971 | Willis . |
| 3,712,740 | 1/1973 | Hennings . |
| 3,721,759 | 3/1973 | Lang . |
| 3,732,002 | 5/1973 | Wiesler et al. . |
| 3,738,730 | 6/1973 | Binnings et al. . |
| 3,851,972 | 12/1974 | Smith et al. . |
| 3,955,072 | 5/1976 | Johannsmeier . |
| 4,012,112 | 3/1977 | Masterson . |
| 4,189,953 | 2/1980 | Volk . |
| 4,190,314 | 2/1980 | Goldsmith . |
| 4,191,916 | 3/1980 | Zasio et al. . |
| 4,223,257 | 9/1980 | Miller . |
| 4,248,498 | 2/1981 | Georges . |
| 4,338,024 | 7/1982 | Bolz et al. . |
| 4,367,915 | 1/1983 | Georges . |
| 4,442,388 | 4/1984 | Phillips . |
| 4,453,807 | 6/1984 | Faulkner et al. . |
| 4,513,438 | 4/1985 | Graham et al. . |
| 4,519,087 | 5/1985 | Deindoerfer . |
| 4,667,335 | 5/1987 | Deindoerfer . |
| 4,741,043 | 4/1988 | Bacus ................................ 350/534 |

FOREIGN PATENT DOCUMENTS

| | | |
|---|---|---|
| 94901 | 10/1973 | Fed. Rep. of Germany . |
| 2449245 | 3/1983 | Fed. Rep. of Germany . |
| 3222594 | 6/1983 | Fed. Rep. of Germany . |
| 3318959 | 7/1983 | Fed. Rep. of Germany . |

Primary Examiner—Jon W. Henry
Attorney, Agent, or Firm—R. Neil Sudol; Henry D. Coleman

[57] ABSTRACT

An assembly for use with an optical microscope in visually detecting the presence of a microscopic object in a sample and determining the position of the object in the sample to enable repeated visual observation of the object, the microscope having a microscope stage and an objective lens system with an optical path, comprises a slide holder removably attachable to the microscope stage in a plurality of alternative positions with respect to the stage for movably holding a slide bearing the sample, the slide holder including a frame stationary with respect to the stage and a slide carrier automatically shiftable with respect to the frame and the stage. The assembly further comprises a drive operatively connected to the slide holder for shifting the carrier and the slide carried thereby along a search path to enable a visual inspection of the sample. Mounting elements are provided on the carrier for mounting the slide to the carrier and for positioning the slide at a predeterminable fixed position and orientation with respect to the carrier. A monitoring device is operatively connected to the slide holder and to the drive for measuring changes in the position of the carrier relative to the frame and signaling the drive as to the measured changes in the position of the carrier. The carrier is provided with a zeroing mark for establishing an x-y coordinate system reference position of the carrier with respect to the frame, the zeroing mark being an x-y coordinate system reference mark viewable by an observer through the lens system upon a mounting of the slide holder to the microscope stage carrier.

12 Claims, 5 Drawing Sheets

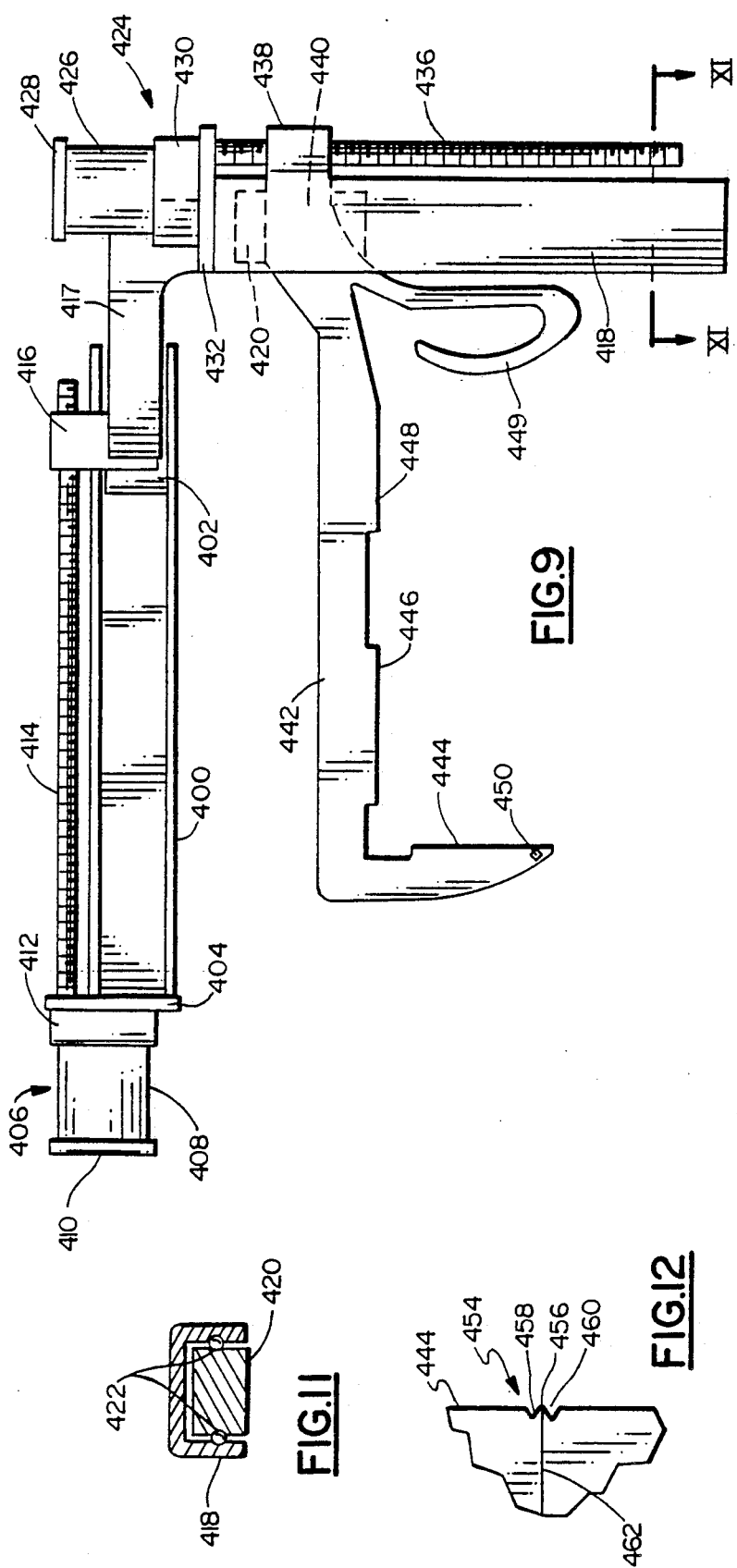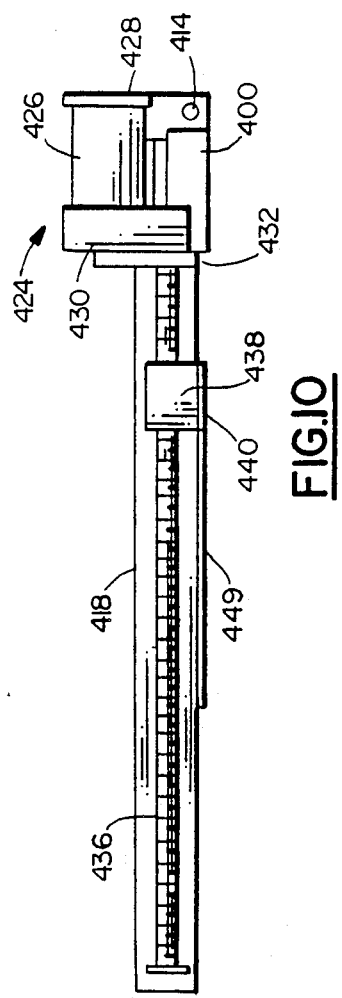

METHOD AND APPARATUS FOR USE IN MICROSCOPE INVESTIGATIONS WITH A CARRIER HAVING EXACTLY ONE X-Y COORDINATE SYSTEM REFERENCE MARK

BACKGROUND OF THE INVENTION

This invention relates to an apparatus for making investigations with microscopes. More particularly, this invention relates to a method and apparatus usable with an optical microscope for visually detecting the presence of a microscopic object in a sample and determining the position of the object in the sample to enable repeated visual observation of the object.

U.S. Pat. No. 4,833,382 to Gibbs discloses such a method and apparatus. As described in that patent, a slide holder is removably attachable to a stage of an optical microscope for shifting a slide to enable a visual inspection of a sample on the slide and a determination of the position of a microscopic object in the sample. The slide holder includes a frame stationary with respect to the stage and a slide carrier shiftable with respect to the frame. The microscope is provided with a lens system having an optical path, cooperating elements being provided on the slide and the carrier for positioning the slide at a fixed position and orientation with respect to the carrier. A zeroing or reference mark is provided on the slide for establishing an x-y coordinate system reference position of the carrier with respect to the frame, the zeroing or reference mark being integral with and essentially permanently disposed on the slide and separate from the sample and viewable by an observer through the lens system of the microscope upon a mounting of the slide to the carrier and upon an adjusting of the position thereof with respect to the microscope so that the reference mark is disposed in the optical path.

The apparatus, method and associated slide described in U.S. Pat. No. 4,833,382 has many advantages, in particular its ability to facilitate locating a microscopic object of a desired kind to enable repeated observations of the microscopic object subsequent to the initial location thereof. It has been found in practice, however, that despite the advantages, the apparatus and method give rise to certain inconveniences to users. In particular, laboratories which use the apparatus frequently receive from their customers slides which are not provided with the requisite reference mark. The slides must then be examined by ordinary techniques to relocate previously located organisms and other microscopic objects.

OBJECTS OF THE INVENTION

An object of the present invention is to provide an improved method and apparatus of the above-described type.

Another object of the present invention is to provide such a method and apparatus which results in greater convenience to users.

Yet another object of the present invention is to provide such a method and apparatus which results in reduced costs of an ongoing or continuing nature.

Another, more particular, object of the present invention is to provide such a method and apparatus which has two operating modes having different accuracy ranges.

SUMMARY OF THE INVENTION

The present invention is directed in part to an assembly for use with an optical microscope in visually detecting the presence of a microscopic object in a sample and determining the position of the object in the sample to enable repeated visual observation of the object, the microscope having a microscope stage and an objective lens system with an optical path. In accordance with the present invention, the assembly comprises a slide holder removably attachable to the microscope stage in a plurality of alternative positions with respect to the stage for movably holding a slide bearing the sample, the slide holder including a frame stationary with respect to the stage and a slide carrier automatically shiftable with respect to the frame and the stage. The assembly further comprises a drive operatively connected to the slide holder for shifting the carrier and the slide carried thereby along a search path to enable a visual inspection of the sample. Mounting elements are provided on the carrier for mounting the slide to the carrier and for positioning the slide at a predeterminable fixed position and orientation with respect to the carrier. A monitoring device is operatively connected to the slide holder and to the drive for measuring changes in the position of the carrier relative to the frame and signaling the drive as to the measured changes in the position of the carrier. The carrier is provided with a zeroing mark for establishing an x-y coordinate system reference position of the carrier with respect to the frame, the zeroing mark being an x-y coordinate system reference mark viewable by an observer through the lens system upon a mounting of the slide holder to the microscope stage carrier.

The mounting element on the carrier includes an edge of the carrier which cooperates with an edge of the slide to position and orient the slide relative to the slide holder. Preferably, the reference mark is disposed on the carrier along the edge thereof.

A memory is operatively connected to the monitoring device for automatically storing the position of the carrier with respect to the frame upon the disposition of the reference mark in the optical path, and the assembly further comprises manually operable a switching device connected to the memory for initating automatic storage thereby.

The reference mark may take any appropriate form, including, for example, a circle, an arrow, a dot, or a pair of crossed line segments or a line intersecting an edge of the carrier at a selected point.

The present invention is also directed to a method for use with an optical microscope to aid in visually detecting the presence of a microscopic object in a sample and determining the position of the object in the sample to enable repeated visual observation of the object, the microscope having a microscope stage and an objective lens system with an optical path. The method comprises the step of attaching, to the microscope stage, a slide holder including a frame and a movable slide carrier for shifting a microscope slide along a search path to enable a visual inspection of the sample, the frame being stationary with respect to the stage and the carrier being at least partially automatically shiftable with respect to the frame and the stage, the carrier being provided with a mounting element for cooperating with the slide to mount the slide to the carrier and for positioning the slide at a predeterminable fixed position and orientation with respect to the carrier, the carrier being provided with a zeroing mark for establishing an x-y coordinate system reference position of the carrier with respect to the frame, the zeroing mark taking the form of an x-y coordinate system reference mark viewable by an observer through the lens system upon a mounting of the slide holder to the microscope stage carrier. In another step of the method, the position of the carrier is adjusted relative to the frame and the microscope so that the reference mark is located in the optical path of the lens system of the microscope, thereby establishing the reference position, and can be viewed by an operator through the lens system. The reference mark is then viewed through the lens system of the microscope and the reference position of the carrier with respect to the frame is at least partially automatically recorded upon a visual locating of the reference mark through the lens system.

Pursuant to another feature of the above method in accordance with the present invention, (a) a microscope object slide bearing the sample is provided, (b) the object slide is mounted to the carrier so that the object slide has the predeterminable fixed position and orientation with respect to the carrier, (c) the carrier and the object slide are shifted relative to the frame and the microscope along the search path, (d) the sample is observed through the lens system of the microscope during the movement of the object slide along the search path to detect the presence of a microscopic object of a preselected kind in the sample, (e) a change in the position of the carrier and the object slide from the reference position is automatically measured upon locating a microscopic object of the preselected kind in the optical path of the lens system, and (f) the measured change in the position of the carrier and the object slide from the reference position is recorded upon locating a microscopic object of the preselected kind in the optical path of the lens system.

Pursuant to yet another feature of the above method in accordance with the present invention, the object slide is mounted to the slide holder or to an identical slide holder on another microscope, and the carrier of the respective slide holder is substantially automatically shifted to move the object slide in accordance with the recorded measured change in position, whereby the detected microscopic object slide may be located and relocated essentially independently of the orientation of the object slide with respect to a respective microscope stage.

Pursuant to another feature of the present invention, the movement of the carrier is controlled by a preprogrammed device. Information is fed to the preprogrammed device for defining a parameter of the search path prior to operating the carrier to move the object slide.

Pursuant to an additional feature of the above method in accordance with the present invention, a microscope object slide bearing the sample is provided. The object slide is mounted to the carrier so that the object slide has the predeterminable fixed position and orientation with respect to the carrier. Upon such a mounting of the object slide to the carrier, the carrier is moved from the reference position a first predetermined distance along a first axis and a second predetermined distance along a second axis substantially orthogonal to the first axis so that a preselected location on the object slide is positioned in the optical path and can be viewed by an operator through the lens system. An operator then observes a microscopic object at the predetermined location in the sample through the lens system.

A method and apparatus in accordance with the present invention results in greater convenience to users for the reason that slides of any kind may be used with the apparatus, regardless of whether the slides bear an x-y coordinate system reference mark. Instead, the reference mark for zeroing the system is located on the removable slide holder and particularly on the carrier thereof. A laboratory using the method and apparatus of the instant invention need not require all of its customers to use slides bearing a special reference mark. Such an advantage reduces costs for those laboratories which might otherwise be required to supply special slides to their customers.

However, it is to be noted that a method and apparatus in accordance with the present invention is not incompatible with the method and apparatus described in afore-mentioned U.S. Pat. No. 4,833,382 insofar as the method and apparatus described and claimed in that patent may be used in complement to the method and apparatus described herein.

BRIEF DESCRIPTION OF THE DRAWING

FIG. 9 is a plan view of yet another mechanical slide shifting assembly usable with the present invention.

FIG. 10 is a side elevational view of the mechanical slide shifting assembly shown in FIG. 9.

FIG. 11 is a cross-sectional view taken along line XI—XI in FIG. 9.

FIG. 12 is a partial top view of an edge of a slide carrier utilizable in the assembly illustrated in FIG. 9, showing a coordinate system reference mark in accordance with the present invention.

DETAILED DESCRIPTION

Figure 1:
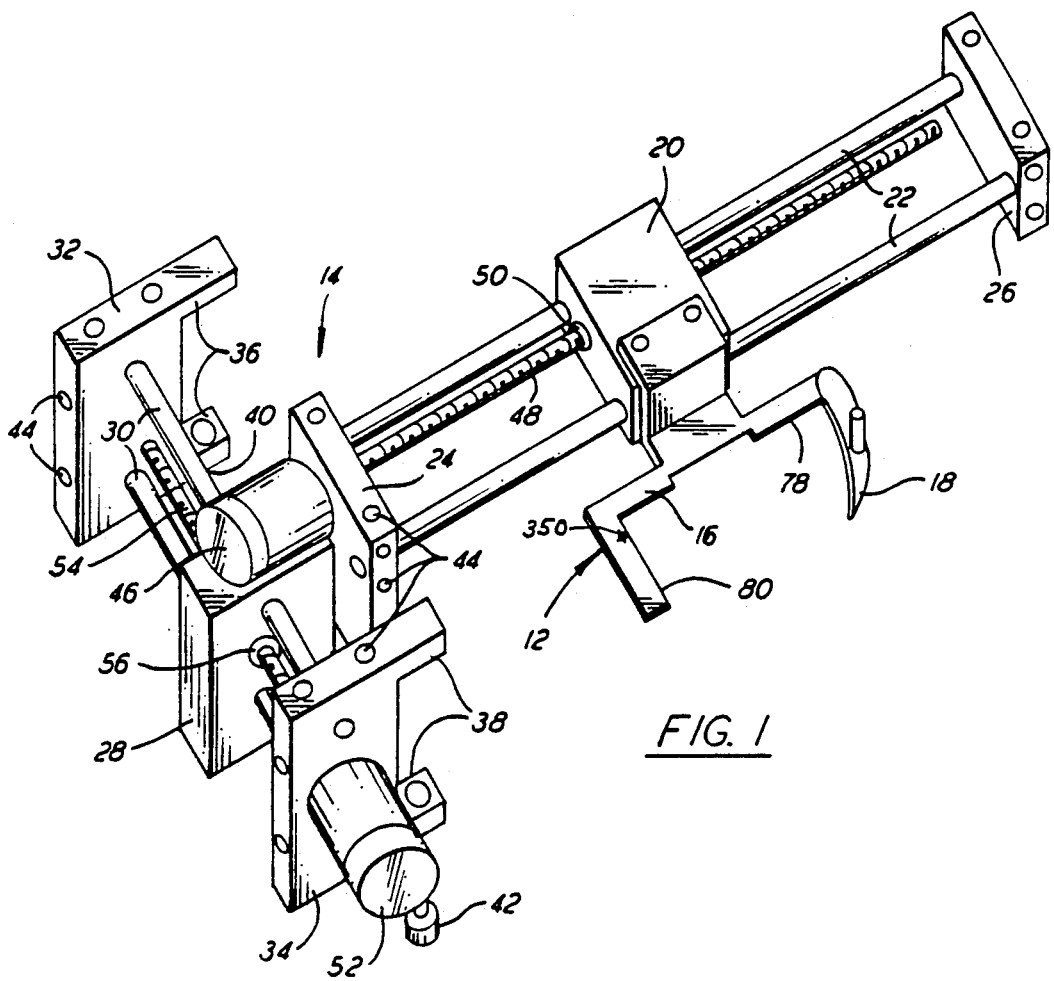
FIG. 1 is an isometric view of a mechanical slide shifting assembly usable with the present invention.

As illustrated in FIG. 1, a device attachable to the stage of a microscope for holding a microscope slide 10 (see FIG. 3) and for shifting the slide relative to the microscope stage comprises a slide carrier 12 and a frame 14. Slide carrier 12 includes an L-shaped member 16 and a spring-loaded clamping member 18 pivotably mounted at one end of L-shaped member 16 for cooperating therewith to hold a slide in a fixed position and orientation relative to carrier 12 Clamping member 18 carries a handle 19 in the form of a peg for facilitating the swinging of member 18 into an open position allowing the insertion of a slide.

Carrier 12 is fastened to a carriage 20 slidably mounted to frame 14 via a pair of parallel rails 22. One of the two rails 22 is rigidly mounted in a pair of support brackets 24 and 26, while the other rail is resiliently mounted thereto.

Support bracket or plate 24 is attached to another carriage 28 in turn slidably mounted to a pair of parallel rails 30 for motion in a direction perpendicular to the direction of motion of carriage 20 along rails 22. Rails 30 extend between a pair of end plates or brackets 32 and 34 each provided on one side with a respective pair of fingers 36 and 38 defining respective recesses for receiving an edge portion of a microscope stage. Two clamping screws 40 and 42 are each threaded to the lower members of finger pairs 36 and 38 for clamping frame 14 to a microscope stage.

End plates or brackets 24, 26, 32 and 34 are provided with theaded bores 44 for the attachment of cover plates (not illustrated).

Mounted to an upper surface of carriage 28 is an x-axis servo motor 46 with a built-in Hall-effect sensor (not illustrated) and a disc (not illustrated) with 15 magnetic spots. The rotor of motor 46 is connected to a threaded lead screw 48 which meshes with a threaded element 50 of carriage 20 for translating that carriage along guide rails 22.

A y-axis servo motor 52 is mounted to end bracket 34 and has a rotor connected to another elongate threaded lead screw 54 in turn meshing with a threaded element 56 of carriage 28, whereby that carriage is translatable along guide rails 30 through the action of motor 52. Like x-axis dc servo motor 46, y-axis dc servo motor 52 is provided with a built-in Hall-effect sensor and a disc with 15 magnetic spots detectable by the sensor for tracking the motion of the associated carriage.

Preferably, lead screws 48 and 54 each have approximately 40 threads per inch. Lead screws 48 and 54 are connected to the rotors of respective motors 46 and 52 by means of respective thrust bearings.

Carriages 20 and 28 are advantageously made of a synthetic resin material and are each provided with an anti-backlash nut and two linear bearings machined of a single block.

Figure 2:
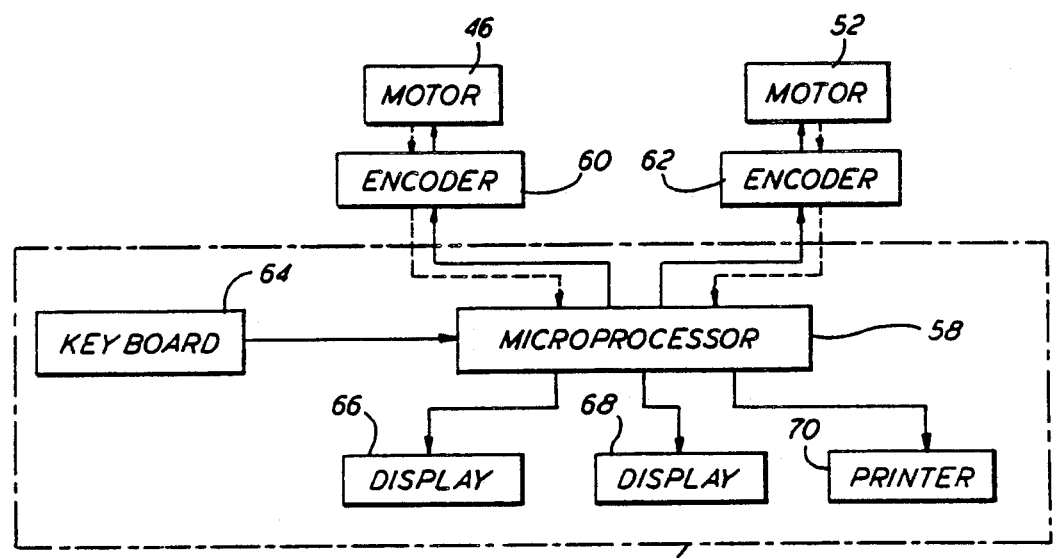
FIG. 2 is a block diagram of a control system for the slide shifting assembly of FIG. 1.

As illustrated in FIG. 2, motors 46 and 52 are controlled by a microprocessor 58 via respective encoders or peripheral interface adapters 60 and 62. As more fully described hereinafter, microprocessor 58 generates signals for controlling the energization of motors 46 and 52 in response to instructions from a keyboard 64. As indicated by dashed lines in FIG. 2, microprocessor 58 receives signals from the built-in Hall-effect sensors in motors 46 and 52 for monitoring the x-axis position of carriage 20 along rails 22 and the y-axis position of carriage 28 along rails 30. Microprocessor 58 is also connected at several outputs to a pair of displays 66 and 68 and a printer 70.

In accordance with the present invention, microscope slide 10 (FIG. 3) is provided with a reference mark 72 for establishing, upon a mounting of the slide to carrier or holder 12, a reference position of slide 10 and slide carrier 12 with respect to frame 14. Pursuant to the invention, the instantaneous x and y positions, relative to reference mark 72, a point on the slide located in the optical path of a microscope are continuously tracked by microprocessor 58 by means of the signals received from the sensors in motors 46 and 52.

Slide 10 has a pair of mutually perpendicular straight edges 74 and 76 engageable with respective inside edges 78 and 80 of slide carrier 12 for fixing the slide at a predeterminable fixed position and orientation with respect to the carrier. Slide 10 is mounted to carrier 12 by first pivoting spring-loaded clamping member 18 away from L-shaped member 16 (counterclockwise in FIG. 1), placing the slide so that edges 74 and 76 engage edges 78 and 80 and then pivoting clamping member 18 in the opposite direction to hold slide 10 against L-shaped member 12. Upon the mounting of the slide to slide carrier 12, the position of carrier 12 relative to frame 14 and the microscope stage to which frame 14 is attached is adjusted by microprocessor 58 in response to signals from keyboard 64 so that the reference mark 72 is located in the optical path of the lens system of the microscope and can be viewed by an operator through that lens system. In response to a signal from keyboard 64, microprocesor 58 automatically records or stores, as a reference position of slide 10 and slide carrier 12, the x position of carriage 20 along rails 22 and the y position of carriage 28 along rails 30. This recorded reference position serves as a standard against which subsequent movements of the carriages are measured.

Figure 3:
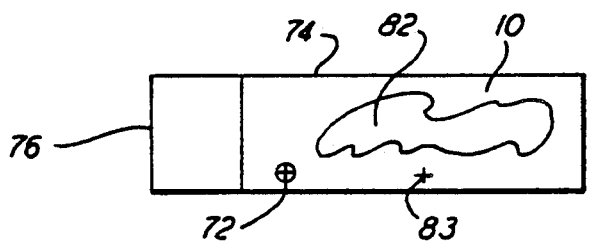
FIG. 3 is a plan view of a slide in accordance with a feature of the present invention.

As schematically illustrated in FIG. 3, slide 10 is provided with a sample 82 such as a smear of blood from a patient. In accordance with the invention, slide 10 is automatically moved along a meander path to enable a systematic, careful and complete visual inspection of sample 82 by an operator via the lens system of a microscope. Upon the detecting of a microscopic object of interest in sample 82, the relative positions of carriages 20 and 28 along rails 22 and 30, respectively, are stored in a non-volatile internal memory of microprocessor 58, shown on displays 66 and 68 (FIGS. 2 and 5) or printed on a sheet of paper by printer 70. In a preferred embodiment of the invention, position coordinates for a multiplicity of detected microscopic objects (e.g., 40) may be registered in a modular RAM component (e.g., in a card) which may be disconnected from microprocessor 58, stored and subsequently reconnected to the microprocessor. A slide can be successively shifted to a series of different positions by repeatedly actuating a keyboard button to read the encoded positions from the RAM card.

At some time subsequent to the removal of slide 10 from carrier 12, it may be desired to view again the microscopic object detected during the initial visual inspection. In this case, slide 10 is again secured to carrier 12 in the manner set forth above or to the carrier of an assembly identical to that of FIG. 1 on another microscope (e.g., in a different laboratory). In response to signals from keyboard 64, microprocessor 58 operates motors 46 and 52 to shift carriers 20 and 28 so that reference mark 72 appears in the optical path of the microscope to which the subject slide shifting assembly is attached. The x and y positions of carriages 20 and 28 are then recorded as a new reference position by the respective microprocessor 58. Subsequently, in response to signals from keyboard 64 encoding the previously measured position of the detected microscopic object, microprocessor 58 automatically translates carriages 20 and 28 via motors 46 and 52 to position slide 10 so that the detected microscopic object is located in the optical path of the microscope.

It is to be noted that, owing to the use of reference mark 72 and the computation of slide and carrier positions relative to frame 14, with an initial location of reference mark 72 in the optical axis of a microscope serving as a reference or standard position, a detected microscopic object may be located and relocated in the optical axis of one or more microscopes without regard to the orientation of rails 22 and 30 with respect to the microscope stages. Accordingly, a detected microscopic object can be repeatedly observed on different occasions and even in different facilities without a need for expensive equipment and complicated techniques.

Figure 4:
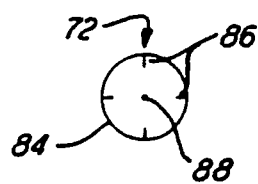
FIG. 4 is a diagram of a reference mark on the slide of FIG. 3.
Figure 5:
FIG. 5 is a diagram of another reference mark usable as an alternative to the reference mark of FIG. 4.

As illustrated in FIG. 4, reference mark 72 may comprise an outer circle 84 provided with radially and inwardly extending line segments 86 and a central pin point 88. Alternatively, as shown in FIG. 5, the reference mark may take the form of a pair of crossed line segments 90.

Figure 6:
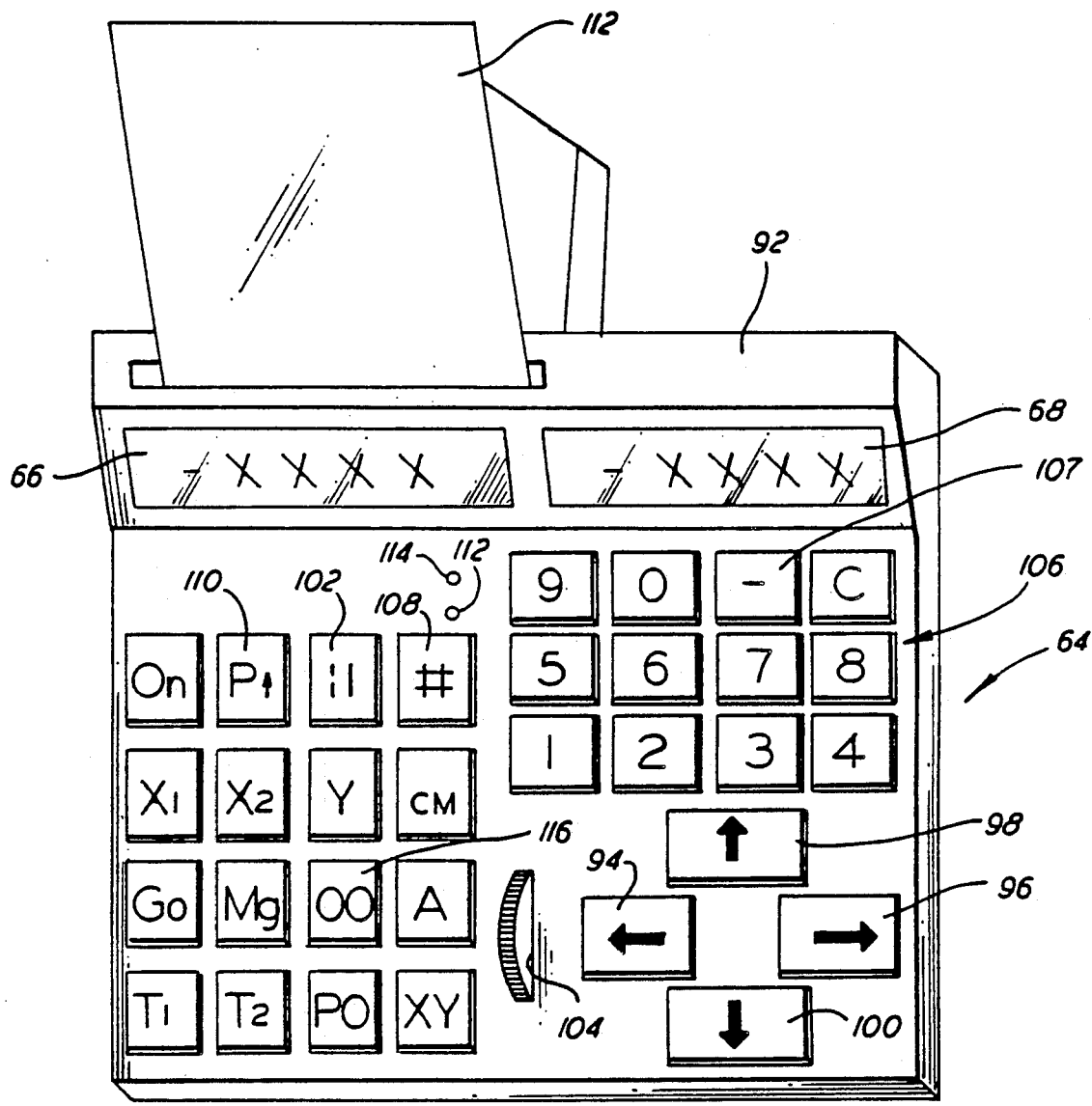
FIG. 6 is an isometric view of a control unit for a slide shifting system such as that illustrated in FIGS. 1 and 2.

The operation of the automatic slide shifting assembly illustrated in FIGS. 1 and 2 will now be described in detail with reference to FIGS. 6 and 7. As illustrated in FIGS. 2 and 6, a control unit 92 of an automatic slide shifting assembly in accordance with the present invention includes a plastic housing 94 containing microprocessor 58, keyboard 64, displays 66 and 68 and printer 70. Keyboard 64 includes a key labelled "ON" which serves to turn on the unit and to supply power to motors 46 and 52. If the ON key is pushed while control unit 92 is operating, the unit is de-energized. Keyboard 64 further includes four directional keys 94, 96, 98 and 100 which, when pushed, direct microprocessor 58 to move carriage 20 in one direction or the other along rails 22 or to move carriage 28 in one direction or another along rails 30. Keys 94, 96, 98 and 100 are used, for example, to shift slide 10 and carrier 12 so that reference mark 72 appears in the visual field of a microscope to which the device of FIG. 1 is attached by means of clamping screws 40 and 42.

A button or finger pad 102 of keyboard 64 is used to determine whether the mode of x-axis motion of carriage 20 along rails 22 is continuous or stepped. In the continuous mode, the speed of carriage 20 during an x-axis sweep is smooth and at a substantially constant speed. In the stepped mode, motor 46 is energized with pulses, the distance that carriage 20 moves with each pulse being keyed to the distance that carriage 28 moves during a step along the y axis. The duration of the pauses between successive energization pulses supplied to motor 28 is determined by the setting of a speed control wheel 104. In the continuous mode, the setting of speed control wheel 104 determines the rate at which carriage 20 moves along rails 22. Each actuation of button 102 changes the motion mode from one to the other of the two modes.

Keyboard 64 includes a set of 11 numbered keys 106 in turn including one key 107 labeled with the symbol "—" (dash). These keys can be used to feed numerical values to microprocessor 58, for example, the x and y coordinates of a previously located microscopic object in a sample, these coordinates being determined with respect to reference mark 72, as described above. In an alternative mode of operation, numerical keys 106 may be used for counting the incidence of various microscopic bodies within a sample on a slide. Pursuant to this counting mode, each key may be paired with a respective kind of organism or other microscopic body.

Keyboard 64 is provided with a key 108 for changing the operation of numerical keys 106 back and forth between the numerical mode and the counting mode. During the counting mode, the tallies corresponding to the various numerical keys being used do not appear on displays 66 and 68. Instead, at any time that a talley of counts is desired, a key labelled "PO" is pressed to actuate printer 70 (FIG. 2) to print on a strip of paper 112 the number of counts recorded for each of the numerical keys 106 and the percentage of the total that each talley comprises. A key 110 included in keyboard 64 is used to advance paper strip 112 between successive printing operations.

Control unit 92 may be provided with a light 114 which indicates, when lit, that numerical keys 106 are operating in the counting mode. Control unit 92 is designed so that the x and y coordinates of a located microscopic object can be printed on paper strip 112 even when numerical keys 106 are operating in the counting mode.

Motors 46 and 52 may be energizied by microprocessor 58 in response to the actuation of directional keys 94, 96, 98 and 100. Alternatively, motors 46 and 52 may be controlled by microprocessor 58 in an automatic scanning mode so that the path traced by carrier 12 and a microscope slide 10 held thereby is a meandering path consisting of a multiplicity of x-axis path portions parallel to rails 22, each pair of adjacent x-axis path portions being interconnected by a respective y-axis path segment parallel to rails 30. A key A is included in keyboard 64 for switching the scanning operation from a "manual" mode to the automatic mode. The manual mode may be entered from the automatic mode by pressing key A or any one of directional keys 94, 96, 98 and 100.

Control unit 92 is provided with a display light 114 for indicating, when lit, that the slide shifting assembly in accordance with the invention is operating in the automatic scanning mode.

The size of the y-axis path segment in the automatic scanning mode is calculated by microprocessor 58 in accordance with the magnification setting of the microscope being used, this setting being fed to microprocessor 58 via numerical keys 106. Keyboard 64 includes a key Mg for inducing the appearance on one of the displays 66 and 68 of the current magnification setting stored in microprocessor 58. If any of the numerical keys 106 are actuated while the current magnification setting is displayed, a new number setting corresponding to the entered digits will be memorized by microprocessor 58 and used to calculate a new y-axis path segment size for the automatic scanning mode, as well as the x-axis pulse field size for the stepped mode of motion of carriage 20.

Keyboard 64 includes three keys $X_1$, $X_2$ and Y used for setting the margins of the field scanned in the automatic scanning mode. Accordingly, one or the other of the two x-axis boundaries of the x-axis scan during the automatic scanning mode is set by moving carrier 12 so that the desired boundary is located in the optical axis of the microscope and by, at that juncture, pushing the respective x-axis endpoint key $X_1$ or $X_2$. The bottom margin of the meander path, i.e., the location of the last x-axis path portion, is communicated to microprocessor 58 by moving the carrier so that the desired lower margin is located in the optical field of the microscope and by then actuating key Y. Alternatively, the x and y boundaries or margins of the field scanned in the automatic scanning mode may be set by actuating a key C, typing in a number and then actuating a respective one of the margin setting keys $X_1$, $X_2$ or Y. As yet another alternative to setting the field size for the automatic scanning mode, the positions of the x margins may be defined by feeding to the microprocessor the location of a center line through the sample 82 relative to the x-axis and a measure of the distance of the x margins from that center line. The center line may be communicated to microprocessor 58 by moving the carrier 12 so that a center line mark 83 (FIG. 3) is located in the optical axis of the microscope and by, thereupon, pushing key X1. The common distance of the x margins from the center line may be communicated to microprocessor 58 by moving the carrier so that one of the margins appears in the optical axis of the microscope and by then depressing key X2.

Keyboard 64 is provided with a key CM for clearing the margins of the field covered in the automatic scanning mode. However, as set forth above, the margins need not be cleared prior to a resetting operation.

Prior to a slide scanning operation, as described above, directional keys 94, 96, 98 and 100 are used to move carrier 12 and a slide 10 held thereby so that reference mark 72 is located preferably approximately in the center of the microscope's visual field. Upon such a positioning of reference mark 72, a key 116 is actuated to induce microprocessor 58 to set the positions of carriages 20 and 28 at that time as references for further displacements of the carriages along rails 22 and 30. Upon subsequent actuations of key 116, microprocessor 58 automatically energizes motors 46 and 52 to position reference mark 72 in the center of the microscope's visual field. The reference positions of the carriages (and hence of carrier 12 and slide 10) can be reset, for example, by turning control unit 92 off (pushing the ON key), again turning the unit on (again depressing the ON key), shifting slide carrier 12 with respect to frame 14 and the microscope stage, and again pressing key 116.

Upon the setting of the reference positions via key 116 and the setting of the margins via keys $X_1$, $X_2$ and Y, the directional keys 94, 96, 98 and 100 may be used to place the slide in a starting position for an automatic scan. Key A is actuated to initiate the scanning operation. Upon the detection of a microscopic object of interest in the sample 82 (FIG. 3), key A or a directional key 94, 96, 98 or 100 is pressed in order to interrupt the automatic scanning. The directional keys may be used at this juncture to place the detected microscopic object in a desired position in the visual field, e.g., at the center of the field. Upon the pressing of a key XY included in keyboard 64, the x and x coordinates of the point on the slide located in the same position in the visual field that reference mark 72 was originally located during the setting of the carriage reference positions are shown on displays 66 and 68.

Upon the clearing of displays 66 and 68 by the actuation of key C, a slide identification number may be entered via numerical keys 106 and displayed upon display 66 or 68. The slide identification number may be printed on paper strip 112 by pushing button PO. Subsequently, upon the locating of a microscopic object of interest, and the display of the x and y coordinates of the detected object (presuming that the object is positioned at the same point in the visual field as reference mark 72 originally was), another actuation of key PO prints the x and y coordinates of the detected object on paper strip 112 proximately to the previously printed slide identification number.

On a later occasion the detected microscopic object may be easily relocated in accordance with the present invention, by mounting slide 10 to carrier 12, using directional keys 94, 96, 98 and 100 to position reference mark 72 at approximately the center of the microscope's visual field, pressing key 116 to set the reference position, clearing the displays by means of key C, entering the x and y coordinates of the detected microscopic object via the numerical keys 106, and actuating a key GO. In response to the actuation of key GO, microprocessor 58 energizes motors 46 and 52 to move carriages 20 and 28 so that the detected microscopic object appears in the microscope's visual field at approximately the same location as when it was originally detected. It is to be noted that the exact position of the detected microscopic object in the microscope's visual field upon the pressing of key GO depends upon the exact positioning of the reference mark 72 in the visual field at the beginning of the first inspection and at the beginning of the reinspection, as well as on the position of the detected object in the visual field when key XY was pushed to record the x and x coordinates of the object.

Keyboard 64 further includes two tab-setting keys $T_1$ and $T_2$, the pressing of which initiates tab-setting motions similar to those of a typewriter. Upon an actuation of key $T_1$, microprocessor 58 energizes motor 46 to shift carriage 20 to a predetermined position along rails 22. Motor 52 may also be energized in this operation. If the control unit 92 is already operating in an automatic scanning mode or if key A is pushed upon the relocation of carrier 12 and slide 10 pursuant to the actuation of key $T_1$, a meander scan is automatically performed at the new position. A subsequent actuation of key $T_1$ again shifts carriage 20 (and possibly carriage 28), as well as carrier 12 and slide 10, along the x-axis to another predetermined position.

An actuation of key $T_2$ will induce microprocessor 58 to move carriage 28 via motor 52 a predetermined distance along rails 30. Alternatively, key $T_2$ may be used for a different tab-setting shift along the x-axis. Keys $T_1$ and $T_2$ are particularly advantageous for scanning 8 or 12 position well slides.

Figure 7:
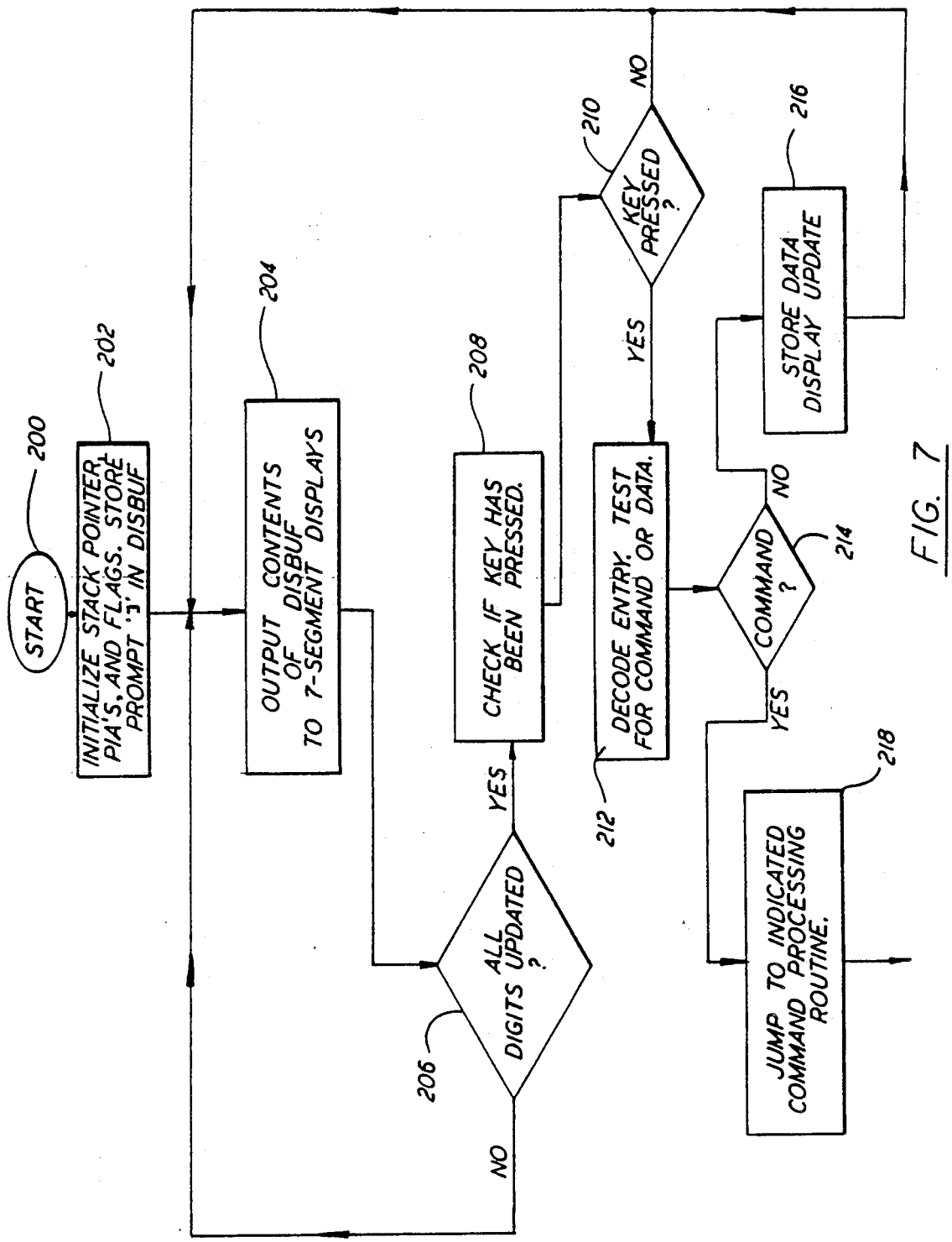
FIG. 7 is a flow chart diagram for a microprocessor shown in FIG. 2.

As illustrated in FIGS. 7, microprocessor 58 executes an initialization procedure 202 upon the energization of control unit 92 at 200. In initialization step 202, microprocessor 58 initializes a stack pointer, a plurality of peripheral interface adapters (included in microprocessor block 58 in FIG. 2), and flags. In addition, microprocessor 58 stores a prompt in a display buffer DISBUF (not illustrated). In a subsequent step 204, the contents of display buffer DISBUF are transmitted to the seven segment display sections of displays 66 and 68. Upon the updating of all the digits, detected by microprocessor at a decision junction 206, the microprocessor checks in a step 208 whether a key of keyboard 64 has been pressed. If a key has been pressed, as determined at a decision junction 210, microprocessor 58 decodes the entry in a step 212 and tests the entry as to whether it constitutes a command or data input. If the entry is a command, as determined by microprocessor 58 at a decision junction 214, the microprocessor jumps to the indicated command processing routine as indicated at 218. If, instead, the entry constitutes data, microprocessor 58 stores the data in an updating step 216.

Keyboard 64 preferably includes two arrays of mutually parallel wires defining a rectangular grid whereby the actuation of a key is detected by first testing each wire in one of the arrays and, upon discovering a closed circuit in one of the columns, testing for key closure in that one column by sequentially setting the wires of the other array at a low voltage and scanning the keyboard rows for a closed circuit. In view of the extensive use of microprocessors in the field of automated investigation of slide samples, as evinced exemplarily by U.S. Pat. Nos. 4,012,112 and 3,851,972, the implementation, in a computer program of the methods of the present invention will be readily apparent to one of ordinary skill in the art.

Figure 8:
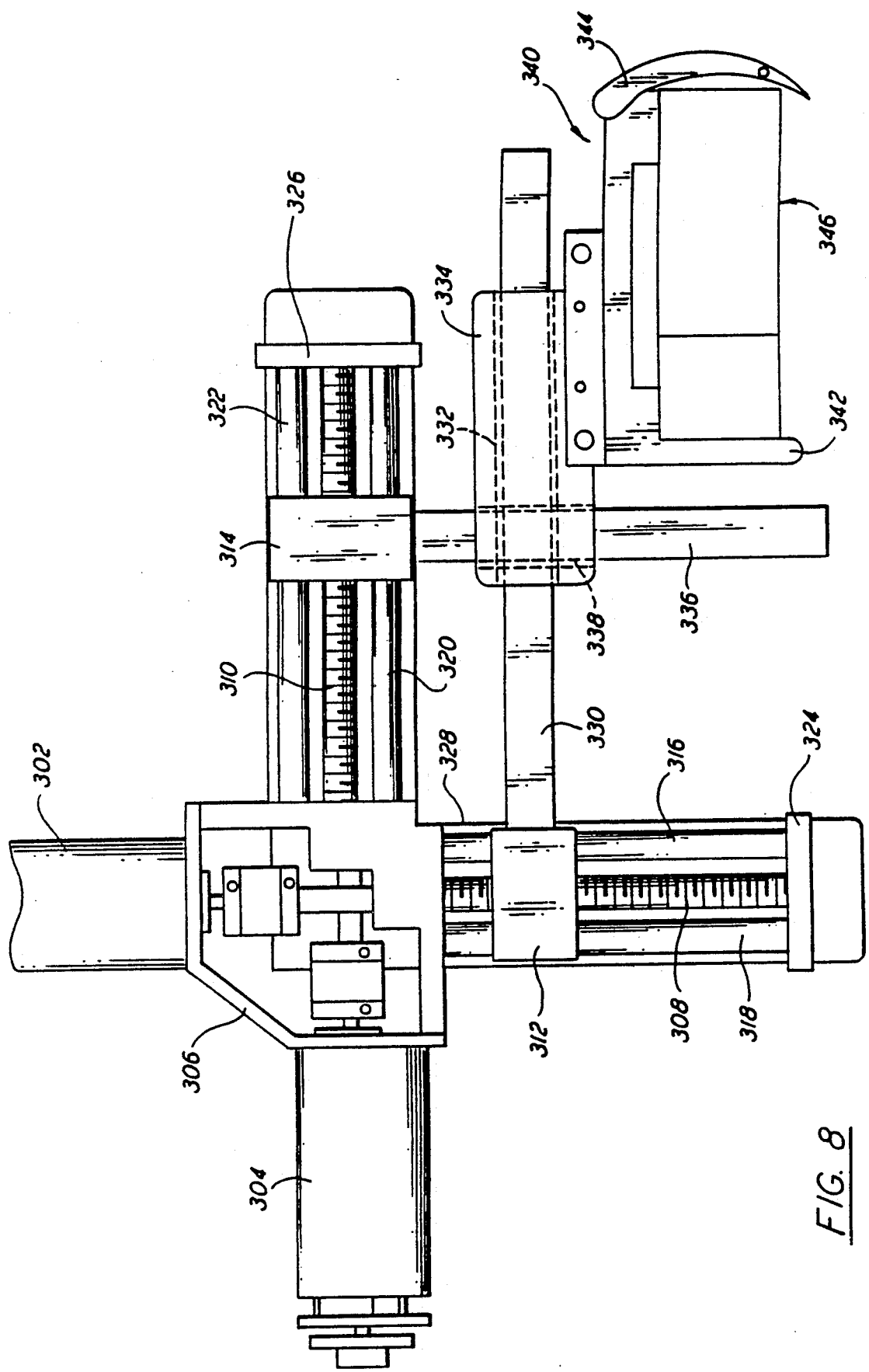
FIG. 8 is a plan view of another mechanical slide shifting assembly usable with the present invention.

As illustrated in FIG. 8, an alternative embodiment of a mechanical slide shifting assembly in accordance with the present invention comprises a pair of fixed d-c stepping motors 302 and 304 fastened to a motor mounting bracket 306. The motors drive respective lead screws 308 and 310 which in turn serve to translate a y-axis carriage 312 and an x-axis carriage 314, respectively. Y-axis carriage 312 is slidably secured to a first rigidly mounted rod 316 and a second rubber-mounted rod 318, which rods extend parallel to one another and to lead screw 308. Similarly, x-axis carriage 314 is slidably secured to a rigidly mounted shaft or rod 320 and to a rubber-mounted shaft or rod 322, shafts 320 and 322 extending parallel to one another at to lead screw 310. Rods 316 and 318 are each secured and one end to mounting bracket 306 and at an opposite end to a yoke or end piece 324, while shafts 320 and 322 are secured at one end to bracket 306 and at an opposite end to another yoke or end piece 326. Bracket 306 and end pieces 324 and 326 are fastened to an L-shaped base member 328.

Rigidly fixed to y-axis carriage 312 is an elongate bar 330 of rectangular cross section. Bar 330 extends in the x direction parallel to shafts 320 and 322 and traverses an elongate opening 332 of substantially identical cross-section in a slide carrier support member 334. Another elongate cross-sectionally rectangular bar 336 is rigidly fastened to x-axis carriage 314 and extends in the y direction parallel to rods 316 and 318. Bar 336 traverses an opening 338 in support member 334 of a cross-section substantially identical to that of bar 336. Support member 334 is slidably but firmly attached to bars 330 and 336 so that motion of y-axis carriage 312 results in a sliding motion of support member 334 along bar 336. Similarly, translation of carriage 314 in the x direction induces a parallel motion of support member 334 along bar 330. Simultaneous motions of carriages 312 and 313 give rise to a curvilinear motion of support member 334.

A slide carrier 340 is bolted to support member 334 and comprises an L-shaped element 342 provided at one end with a spring-loaded sickle-shaped clamping element 344. Clamping element 334 and L-shaped element 342 cooperate to hold a slide 346 in a viewing plane parallel to a microscope stage upon attachment of the microscope slide shifting assembly of FIG. 8 to the microscope stage. Slide 346 takes the form described hereinabove with respect to FIG. 3.

It is to be understood that the functions controlled by keyboard 106 may vary substantially from the functions described hereinabove with respect to FIG. 6 and yet meet the objects of the present invention. For example, microprocessor 58 may be programmed to respond to signals from key 108 so that an actuation of the key upon the completion of a tally removes the instrument from the tally mode and induces microprocessor 58 to print out a tally count, a total and a percentage of the total for each of the 11 numerical keys (including key 107). In addition, upon a clearing of the displays 66 and 68, the scan magnification may be entered into microprocessor 58 by typing in a magnification code number and then pressing magnification key Mg. By way of further example, a series of tab settings may be established upon the actuation of a tab setting key, by entering a 6-digit x-y coordinate, then pressing key 107, entering a second 6-digit x-y coordinate, again pressing key 107, and so forth. Upon finishing the series of tab settings, key 107 is actuated a predetermined plurality of times (e.g., three times). Actuating the tab key will move the slide the first location entered, subsequent actuations of the tab key moving the slide to the locations entered later in the series. The slide location may be printed out each time the slide is moved to a different location. Other tab setting numbers may be entered at the same time to preset the margins for the automatic scan.

Pursuant to the present invention, a zeroing or reference mark 350 is provided on carrier 12 (FIG. 1) along inside edge 80 thereof. The steps described hereinabove for establishing a reference position of carrier 12 relative to frame 14 are then executed using reference mark 350. Preferably, prior to the fixation of frame 14 to a microscope stage, servo motors 46 and 52 are energized, microprocessor 58 (FIG. 2) operating the motors to shift carrier 12 so that reference mark 350 is located in a central position relative to the full range of motion of the carrier along the x-axis and y-axis directions. Upon the centering of carrier 12, frame 14 is manually translated over the microscope stage (not illustrated) to locate reference mark 350 as nearly as possible on the optical axis of the microscope. This manual disposition of reference mark 350 on the microscope's optical axis or at least within the field of view of the microscope's objective lens system may be achieved in part by viewing the reference mark 350 through the objective lens system. Upon a suitable locating of reference mark 350, frame 14 is attached to the microscope stage. Preferably, this attachment is accomplished by the application of an adhesive. The adhesive may take the form of a two-sided adhesive strip on an undersurface of frame 14 or a few drops of a liquid adhesive.

It is to be noted that reference mark 350 may be located generally only through the use of low magnification. The high light intensities required for visual observation at high magnification levels cannot be reached by reflecting light from the upper surface of carrier 12. In this regard it is contemplated that carrier 14 is made of an opaque material. However, greater accuracy in the locating of reference mark 350 and the concomitant establishment of a reference position for carrier 12 may be obtained if carrier 12 is made of a translucent or transparent hard polymeric material such as certain acrylic resins and polypropylene. Alternatively, if the carrier is made of an opaque material, the higher light intensities required for high magnification may be achieved by a special light source placed above the microscopic stage.

It is crucial that reference mark 350 is placed on carrier 12 in a position which may be viewed by the objective lens system of the microscope to which the slide shifting assembly is attached. The optimal placement is along edge 80 or 78 (see FIG. 1).

The use of reference mark 350 basically requires a microscope equipped with the slide shifting assembly to be zeroed only upon energization of the electrical system (FIG. 2). Generally, most microscopes will require zeroing (reference position setting or calibration) only once a day, when the machine is turned on. In contrast, using reference mark 72 on slide 10 will require resetting of the reference position each time a new slide is placed on carrier 12, if the successive slides do not have their reference marks 72 positioned at the same location.

Although the placement and use of zeroing or reference mark 72 on slide 10 (FIG. 3) results in a highly accurate locating and relocating of microscopic objects of interest in sample 82 on slide 10, there are circumstances under which such a high accuracy is not required. Such circumstances exist, for example, when the objects of interst are sufficiently large. Under such circumstances, use of reference mark 350 on carrier 12 is indicated. However, it is to be noted that both reference marks may be used with any one microscope, the reference position corresponding to reference mark 72 on slide 10 and the reference position corresponding to reference mark 350 being defined relative to one another. Thus, if a slide bearing a reference mark 72 arrives for analysis, the reference position corresponding to the slide reference mark 72 is used, particularly if a high degree of accuracy is required in locating a microscopic object in a sample on the slide.

As illustrated in FIGS. 9 and 10, a streamlined embodiment of a slide shifting assembly comprises a first U-shaped rail 400 in which a car 402 is shiftably mounted by means of ball bearings (see FIG. 11). Such a rail and car assembly is marketed by THK Inc. of Japan. Mounted to one end of rail 400 via a bracket 404 is a prepackaged motor assembly 406 including a motor 408, an optical coder 410 and a gear box 412. An elongate threaded lead screw 414 is operatively connected at one end to motor assembly 406 and extends parallel to rail 400. Threaded lead screw 414 drivingly engages car 402 via an internally threaded nut connector 416.

Mounted to car 402 via an L-shaped arm 417 is a second cross-sectionally U-shaped rail 418 in which another car 420 is rollingly mounted via ball bearings 422 (see FIG. 11). Rail 418 opens downwardly, while rail 400 opens upwardly. A second motor assembly 424 including a motor 426, an optical coder 428 and a gear box 430 is fastened to rail 418 via a mounting bracket 432. Motor assembly 424 is operatively connected to an externally threaded lead screw 436 which extends parallel to rail 418. Lead screw 436 is drivingly coupled to car 420 via a nut connector element 438 and an extension 440 of a generally U-shaped unitary slide carrier member 442. Carrier member 442 is formed with edges 444, 446 and 448 defining a mounting position for a microscope slide. Carrier member 442 is also provided with a resilient spring element 449 for pushing a slide against edges 444, 446 and 448.

Carrier 442 is provided along edges 444 (or 446 or 448) with a zeroing or reference mark 450. The use of reference mark 450 is the same as that described hereinabove with reference to reference mark 350 on carrier 12 (FIG. 1).

Reference mark 450 can take virtually any form which is sufficiently well defined so as to be viewable through the objective lens system of a microscope and to provide a specific reference position through visual observation of the mark through the lens system. Accordingly, reference mark 450 must include a fine line and/or a point intentionally provided on the surface or the carrier. Generally, a corner of carrier member 442 (e.g., corner 452 in FIG. 9) will not function adequately as a reference point owing to the rounded nature of the corner when seen under magnification.

As illustrated in FIG. 12, another x-y coordinate system reference mark 454 is a point 456 formed by cutting two notches 458 and 460 next to one another along edge 444 (FIG. 9). A line 462 may be etched into the surface of carrier 442 up to point 456 for facilitating the locating of point 456.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proferred by way of example to facilitate comprehension of the invention and should not be construed to limit the scope thereof.

What is claimed is:

1. An assembly for use with an optical microscope in visually detecting the presence of a microscopic object in a sample and determining the position of said object in said sample to enable repeated visual observation of said object, said microscope having a microscope stage and an objective lens system with an optical path, said assembly comprising:

slide holding means removably-attachable to the microscope stage in a plurality of alternative positions with respect to said stage for movably holding a slide bearing the sample, said slide holding means including a frame stationary with respect to said stage and a slide carrier automatically shiftable with respect to said frame and said stage;

drive means operatively connected to said slide holding means for shifting said carrier and the slide carried thereby along a search path to enable a visual inspection of said sample;

mounting means on said carrier for mounting the slide to said carrier and for positioning the slide at a predeterminable fixed position and orientation with respect to said carrier;

monitoring means operatively connected to the slide holding means and to said drive means for measuring changes in the position of said carrier relative to said frame and signaling said drive means as to the measured changes in the position of said carrier; and zeroing means on said carrier for establishing an x-y coordinate system reference position of said carrier with respect to said frame, said zeroing means including exactly one x-y coordinate system reference mark viewable by an observer through the lens system upon a mounting of said slide holding means to the microscope stage carrier.

2. The assembly defined in claim 1 wherein said mounting means includes an edge of said carrier, said reference mark being disposed on said carrier along said edge.

3. The assembly defined in claim 1, further comprising memory means operatively connected to said monitoring means for automatically storing the position of said carrier with respect to said frame upon the disposition of said reference mark in said optical path, further comprising manually operable switching means operatively connected to said memory means for initating automatic storage thereby.

4. The assembly defined in claim 1 wherein said reference mark includes a circle.

5. The assembly defined in claim 1 wherein said reference mark includes a pair of crossed line segments.

6. A method for use with an optical microscope to aid in visually detecting the presence of a microscopic object in a sample and determining the position of said object in said sample to enable repeated visual observation of said object, said microscope having a microscope stage and an objective lens system with an optical path, said method comprising the steps of:

attaching, to the microscope stage, slide holding means including a frame and a movable slide carrier for shifting a microscope slide along a search path to enable a visual inspection of said sample, said frame being stationary with respect to said stage and said carrier being at least partially automatically shiftable with respect to said frame and said stage, said carrier being provided with mounting means for cooperating with coacting means on the slide to mount the slide to said carrier and for positioning the slide at a predeterminable fixed position and orientation with respect to said carrier, said carrier being provided with zeroing means for establishing an x-y coordinate system reference position of said carrier with respect to said frame, said zeroing means including exactly one x-y coordinate system reference mark viewable by an observer through the lens system upon a mounting of said slide holding means to the microscope stage carrier;

adjusting the position of said carrier relative to said frame and said microscope so that said reference mark is located in the optical path of the lens system of said microscope, thereby establishing said reference position, and can be viewed by an operator through said lens system;

viewing said reference mark through the lens system of the microscope; and at least partially automatically recording said reference position of said carrier with respect to said frame upon a visual locating of said reference mark through said lens system.

7. The method defined in claim 6, further comprising the steps of:

providing a microscope object slide bearing the sample;

mounting said object slide to said carrier so that said object slide has said predeterminable fixed position and orientation with respect to said carrier;

shifting said carrier and said object slide relative to said frame and said microscope along the search path;

observing the sample through said lens system during the movement of said object slide along said search path to detect the presence of a microscopic object of a preselected kind in said sample;

automatically measuring a change in the position of said carrier and said object slide from said reference position upon locating a microscopic object of said preselected kind in said optical path of said lens system; and recording the measured change in the position of said carrier and said object slide from said reference position upon locating a microscopic object of said preselected kind in said optical path of said lens system.

8. The method defined in claim 7, further comprising the steps of mounting said object slide to said slide holding means or to an identical slide holding means on another microscope, and substantially automatically shifting the carrier of the respective slide holding means to move said object slice in accordance with the recorded measured change in position, and whereby said detected microscopic object slide may be located and relocated essentially independently of the orientation of said object slide with respect to a respective microscope stage.

9. The method defined in claim 7 wherein the movement of said carrier is controlled by a preprogrammed device, further comprising the step of feeding information to said preprogrammed device for defining a parameter of said search path prior to operating said carrier to move said object slide.

10. The method defined in claim 6, further comprising the steps of:

providing a microscope object slide bearing the sample;

mounting said object slide to said carrier so that said object slide has said predeterminable fixed position and orientation with respect to said carrier;

upon mounting of said object slide to said carrier, moving said carrier from said reference position a first predetermined distance along a first axis and a second predetermined distance along a second axis substantially orthogonal to said first axis so that a preselected location on said object slide is positioned in said optical path and can be viewed by an operator through said lens system; and observing a microscopic object at said predetermined location in the sample through said lens system upon movement of said carrier through said first predetermined distance and said second predetermined distance.

11. The method defined in claim 9 wherein said first predetermined distance and said second predetermined distance are recorded in digitized form in an electronic memory.

12. The method defined in claim 6 wherein said step of attaching includes the step of adhesively attaching said slide holding means to the microscope stage.

* * * * *

UNITED STATES PATENT AND TRADEMARK OFFICE
CERTIFICATE OF CORRECTION

PATENT NO. : 5,000,554

DATED : March 19, 1991

INVENTOR(S) : David L. Gibbs

It is certified that error appears in the above-identified patent and that said Letters Patent is hereby corrected as shown below:

```
Col. 2, line 44, delete "a" and insert --a-- after "comprises".

Col. 4, line 62, insert --.-- (period) after "12".

Col. 5, line 60, insert --of-- after "72,".

Col. 7, line 64, change "talley" to --tally--.

Col. 8, line 1, change "talley" to --tally--.

Col. 10, line 35, change "FIGS." to --FIG.--.

Col. 11, line 16, change "at" to --and--; line 17, change "and"
   to --at--. (2nd Occur)

Col. 13, line 3, change "interst" to --interest--.
Col. 14,
Claim 6, line 61, delete "," (comma).
Col. 16,
Claim 8, line 11, change "slice" to --slide--.
```

Signed and Sealed this

Twenty-ninth Day of September, 1992

Attest:

DOUGLAS B. COMER

*Attesting Officer*   *Acting Commissioner of Patents and Trademarks*